(12) United States Patent
Proctor

(10) Patent No.: US 7,148,679 B2
(45) Date of Patent: Dec. 12, 2006

(54) TRANSFORMER PROBE

(75) Inventor: Kenneth W. Proctor, Hants (GB)

(73) Assignee: Weston Aerospace Limited, London (GB)

( * ) Notice: Subject to any disclaimer, the term of this patent is extended or adjusted under 35 U.S.C. 154(b) by 133 days.

(21) Appl. No.: 10/413,577

(22) Filed: Apr. 15, 2003

(65) Prior Publication Data
US 2003/0222641 A1 Dec. 4, 2003

(30) Foreign Application Priority Data
Apr. 16, 2002 (GB) ............................ 0208693.2

(51) Int. Cl.
G01R 33/02 (2006.01)
G01R 33/00 (2006.01)
G01R 31/06 (2006.01)

(52) U.S. Cl. ..................... 324/207.14; 324/207.11; 324/547

(58) Field of Classification Search ................ 324/547, 324/207.14, 217, 207.15, 207.21, 207.11
See application file for complete search history.

(56) References Cited

U.S. PATENT DOCUMENTS

| | | | |
|---|---|---|---|
| 3,876,927 A * | 4/1975 | Gee et al. .................... 324/217 |
| 4,444,063 A * | 4/1984 | Snowden et al. ...... 73/862.326 |
| 4,647,892 A * | 3/1987 | Hewitt ......................... 336/83 |
| 4,739,260 A | 4/1988 | Proctor ........................ 324/208 |
| 5,003,259 A * | 3/1991 | Palazzetti et al. ...... 324/207.14 |
| 5,642,043 A | 6/1997 | Ko et al. ................ 324/207.24 |
| 6,300,856 B1* | 10/2001 | Hanley et al. .............. 336/222 |

FOREIGN PATENT DOCUMENTS

| EP | 0 169 670 | 1/1986 |
|---|---|---|
| GB | 1 322 709 | 7/1973 |

* cited by examiner

Primary Examiner—Diane I. Lee
Assistant Examiner—Jeff Natalini
(74) Attorney, Agent, or Firm—Nixon & Vanderhye P.C.

(57) ABSTRACT

A probe (10) for sensing movement of a body of magnetic material comprises a magnetically energisable pole piece (30), a closed loop electrical circuit (20) having a first end (25) which is wound around the pole piece (30) and forms a pole piece coil (25) inductively coupled to the pole piece, the arrangement being such that movement of a body of magnetic material (70) relative to the pole piece (30) induces a current in the closed loop circuit (20), and a second end (45), remote from the pole piece (30), which forms a transformer primary coil. A transformer secondary coil (65) is inductively coupled to the primary coil (45), and terminated by a load resistance and means for measuring an output signal from the secondary coil. The primary (45) and secondary (65) coils form a transformer such that a current in the primary coil induces a voltage across the secondary coil. One or more shorting turns (60) of a conductor are inductively coupled to the primary (45) and secondary (65) coils.

22 Claims, 6 Drawing Sheets

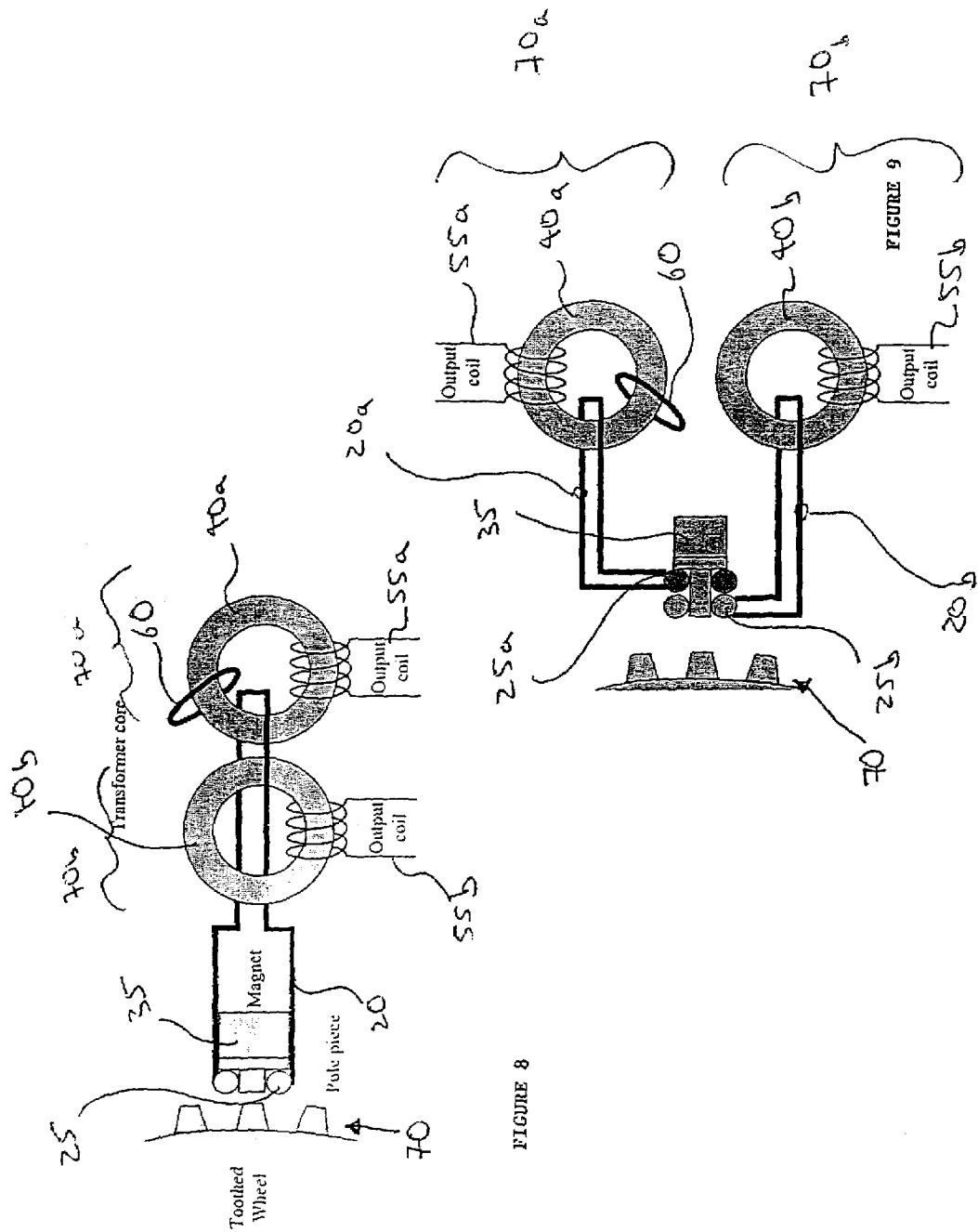

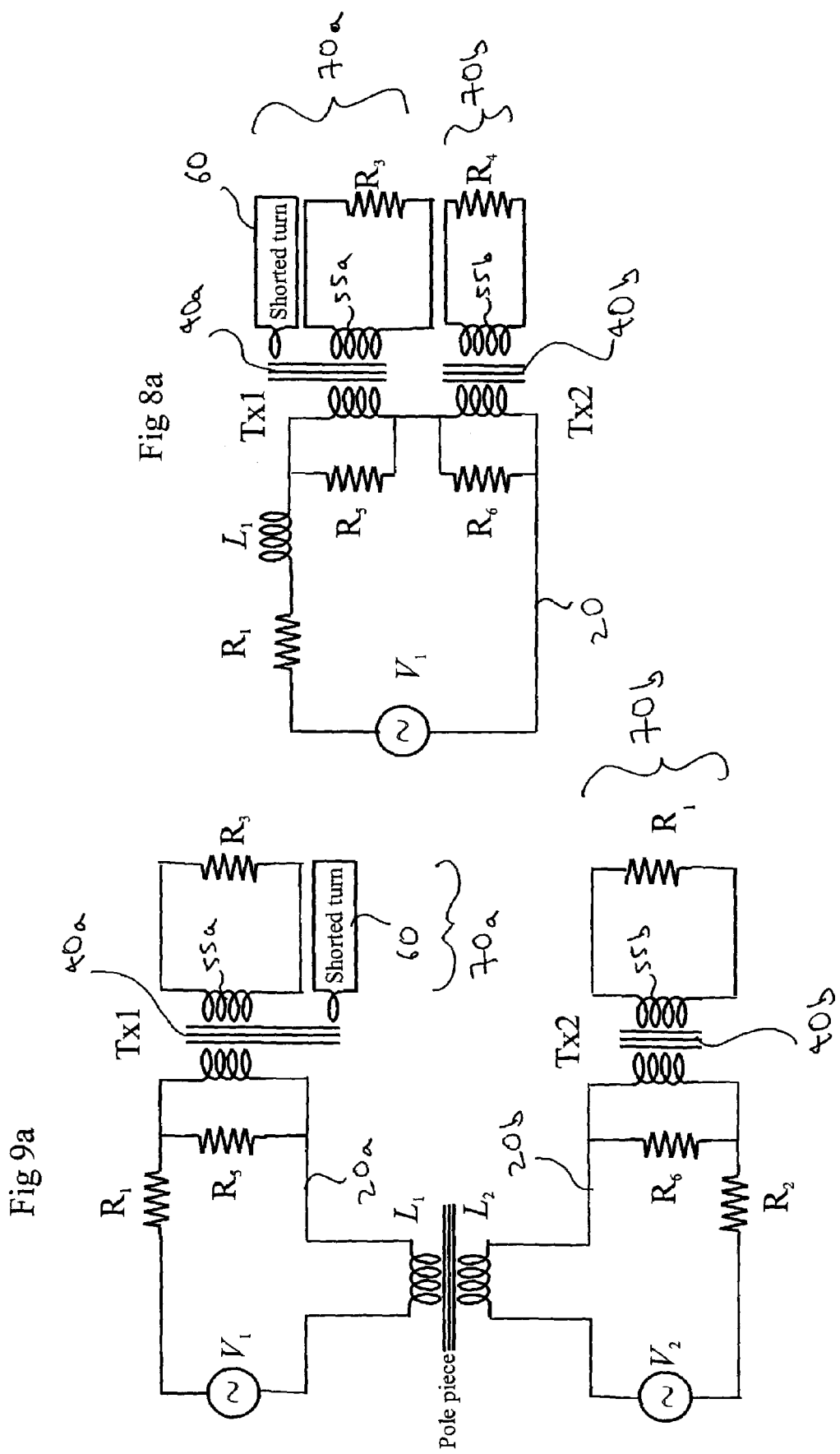

TRANSFORMER PROBE

SUMMARY OF THE INVENTION

1. Field of the Invention

This invention relates to a transformer probe and in particular to a transformer probe for detecting movement of magnetic objects.

2. Discussion of Prior Art

The use of magnetic sensors in co-operation with, for example, one or more projections on a shaft to give an output from which shaft rotational speed or torque may be determined is well known. In such sensors, a voltage, induced in a coil by changes in the magnetic flux pattern of a magnetically energised pole piece, caused by movement of a body of magnetic material in the field from the pole piece is detected and/or measured.

The rotational speed of a rotating element can be determined by measuring the frequency of the periodic signal produced in the coil as one or more markers or elements on the surface of the rotating element passes or pass through the field from the pole piece.

The torque transmitted by a rotating shaft can be measured, for example, by fixing a tubular structure around the shaft whose twist is to be measured, such that one end of the tubular structure is fixed to the shaft while the other end is loose. By measuring the relative time delay between the passing of a marker or element on the surface of the shaft and a corresponding one on the loose end of the tubular structure, the relative angular displacement between the rotating shaft and the tubular structure at the loose end can be measured from which the torque can then be determined.

U.S. Pat. No. 3,876,927 describes a magnetic pickup sensor with a limited output signal amplitude and reduced susceptibility to interference from stray fields.

EP-A-169 670 and U.S. Pat. No. 4,739,260 describe transformer probes for detecting movement of magnetic objects in which one end of a closed loop electrical circuit formed from an electrical conductor is wound around a pole piece such that movement of a magnetic body through a first flux pattern generated by the pole piece induces a current in the conductor which generates a second flux pattern at a second end of the closed loop, remote from the first end, which forms a primary coil of a transformer. The primary coil is inductively coupled to a multi-turn secondary coil terminated at an output pair connected to detecting apparatus. When resistance of the closed loop electrical circuit is low, a magnetic object passing in the vicinity of pole piece induces a low voltage, high current signal in the primary coil that is transformed into a high output voltage at the output pair of the secondary coil.

The transformer probes of EP-A-169 670 and U.S. Pat. No. 4,739,260 suffer from the disadvantage that the amplitude of their output voltages are proportional to the speed of movement of the magnetic object relative to the pole piece, so that high output voltages are generated when the probes are used to measure high speeds.

In certain situations, it is highly undesirable to employ a magnetic sensor having a high voltage output. For example, when employing a magnetic sensor in an explosive environment, such as a gas turbine engine, in order to avoid the occurrence of sparks it is vital that the amplitude of the output voltage of the sensor is limited. The employment of electronic voltage limiters, such as diodes, in such situations is undesirable due to the reliability and redundancy problems associated with them.

SUMMARY OF THE INVENTION

According to a first aspect the invention there is provided a transformer probe.

The present invention overcomes the difficulties encountered in the prior art transformer probes by providing a transformer probe for detecting movement of magnetic objects in which the amplitude of the output voltage of the transformer probe at high movement rates is limited without the need for electronic voltage limiters.

According to the invention in a second aspect there is provided a transformer probe as defined in claim 15 to which reference should now be made.

A further embodiment of the invention provides a transformer probe which can detect the movement of magnetic objects in which the amplitude of an output voltage from the probe is limited without the need for electronic voltage limiter and another output voltage which is not so limited. The arrangement of claim 15 allows one to use a single probe to generate different output voltages meeting possibly different or conflicting requirements.

According to the invention in a third aspect there is provided a transformer probe which has the advantages that two outputs can be generated meeting possibly different or conflicting requirehients, and that the two transformers are very loosely coupled so that any signal injected into one circuit will not affect the other. In certain situations this is desirable.

BRIEF DESCRIPTION OF THE DRAWINGS

Preferred embodiments of the invention will now be described, by way of example, with reference to the accompanying drawings, in which:

FIG. 8 is a schematic illustration of a second embodiment of the invention;

FIG. 8a shows an electrical circuit diagram for the probe of FIG. 8;

FIG. 9 is a schematic illustration of a third embodiment of the invention; and

FIG. 9a shows an electrical circuit diagram for the probe of FIG. 9.

DETAILED DISCUSSION OF EMBODIMENTS

Figure 1:
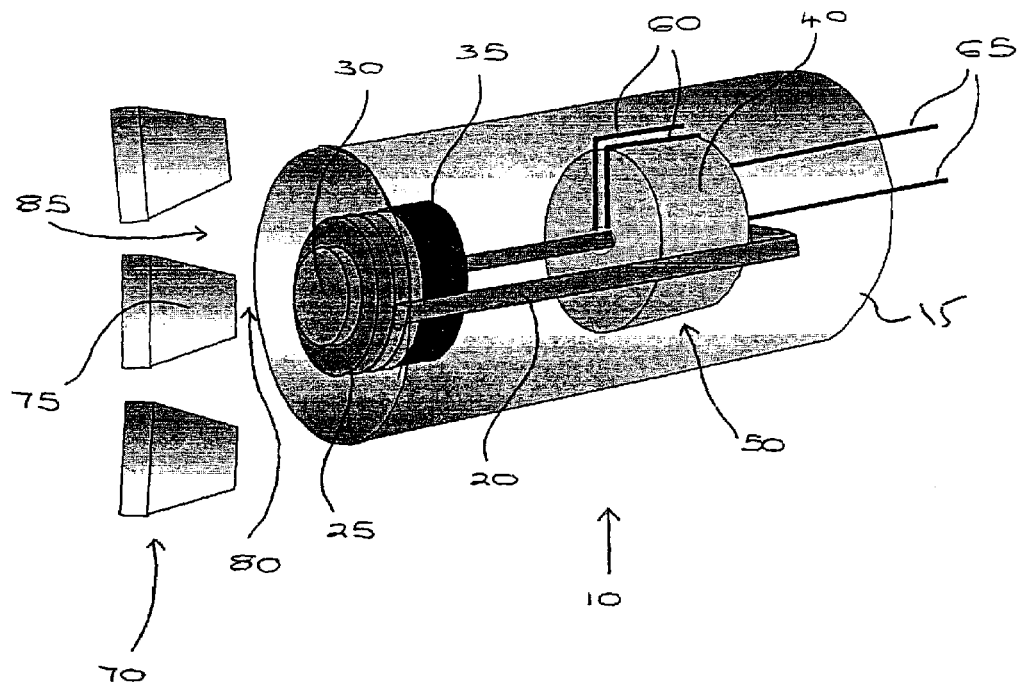
FIG. 1 shows a transformer probe according to a preferred embodiment of the invention for sensing movement of a toothed wheel.
Figure 2:
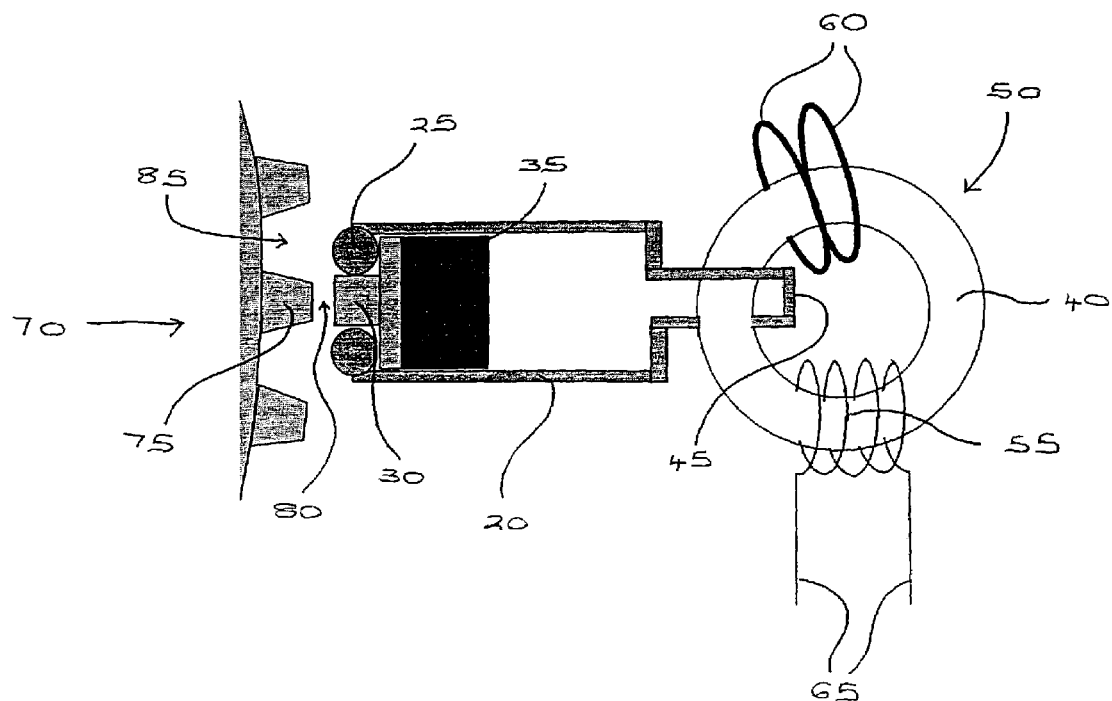
FIG. 2 shows schematically the transformer probe of FIG. 1.

The transformer probe 10 shown in FIGS. 1 and 2 has a cylindrical housing 15 containing a primary closed loop circuit 20 of electrically conductive material. The primary circuit may be formed from copper wire, preferably with a diameter of 1–2 mm, or from any other conductor with low DC resistance such as, for example, steel or bronze.

The primary circuit preferably has a low DC resistance so as to have a low load in comparison to that of the primary coil. For low frequency operation, where the primary circuit resistance is $R_1$ and the primary coil inductance is $L_2$ (see FIG. 6), $R_1 < 2\pi f L_2$. The inductance of the primary coil is likely to be of the order of 1–2 μH and so the resistance of the conducting primary circuit is typically 1–20 mΩ.

A first end 25 of the primary circuit 20 is wound around the pole piece 30 of a permanent magnet 35 forming a pole piece coil 25. The first end of the primary circuit with the magnet 35 is mounted at the front end of the housing 15. The other end of the primary circuit 20, distant from the first end 25, distant from the pole piece 25, is wound around a magnetic core 40, mounted towards the other end of the housing 15, to form a primary coil 45 of a transformer 50. A second coil 55 is wound around the magnetic core 40 to form a secondary coil of the transformer 50. The secondary or output coil 55 is connected by a pair of wires 65 to a load resistance and measuring apparatus which for simplicity have been omitted from the figures. In the preferred embodiment of the invention the load resistance ($R_3$ in FIG. 4) is typically 1–20 kΩ. One, two or more closed turns 60 of a low resistance conductor are also wound around the magnetic core 40 to form shorting or short circuit turns.

The closed or shorting turns may be formed from copper wire, typically with a diameter of the order of 1.0 mm, but may be formed from any low resistivity conductor such as, for example, aluminium or bronze. For high frequency operation (see FIG. 7), where the transformed resistance of the shorting turn or turns is $R_2$ and the inductance of the pole piece coil 25 is $L_1$, $R_2 < 2\pi f L_1$. This resistance is typically in the range of 0.2–2 mΩ. The shorting turn or turns may be of any cross-section, for example round, square or ribbon.

The mode of operation of the transformer probe shown in FIGS. 1 and 2 when employed as a speed sensor will now be described.

In FIGS. 1 and 2, the transformer probe is shown in a first position relative to a toothed wheel 70 of magnetic material, the rotational speed of which is to be measured. The magnetic flux in the pole piece 30 of the probe depends upon the strength of the magnet 35 and upon the magnetic circuit reluctance of the circuit consisting of the magnet 35, pole piece coil 25, air gap 80, wheel 70 and the air path returning magnetic field from the wheel 70 to the magnet 35.

In the first position shown in FIGS. 1 and 2, the pole piece 30 is opposite one of the teeth 75 of the wheel 70, there is a small air gap 80 between the pole piece 30 and the tooth 75 and the magnetic flux in the pole piece 30 is high as the reluctance of the magnetic circuit is low. When the wheel 70 rotates, the position of the pole piece 30 relative to the wheel teeth changes from the first position shown in FIGS. 1 and 2 to a second position wherein the pole piece 30 is opposite a gap 85 between two of the teeth on the wheel 70. In the second position, the air gap 80 between the pole piece 30 and the teeth is large and the magnetic flux in the pole piece 30 is low as the reluctance of the magnetic circuit is high.

As the wheel 70 rotates and the position of the pole piece 30 relative to the teeth on the wheel changes between the first and second positions, the magnetic flux in the pole piece 30 oscillates between high and low values respectively. The changes in the magnet flux of the pole piece 30 caused by the variation in the reluctance of the magnetic circuit as the wheel rotates, induces a voltage in the pole piece 25 and circuit in the primary circuit 20. In the preferred embodiment of the invention and as discussed above, the resistance of the primary circuit is very low, such that a high current flows in the circuit. The magnetic flux generated by the current in the primary coil 45 of the transformer 50, which is a part of the primary circuit 20 wound on the magnetic core 40, induces a voltage in the output coil 55, which is also wound on the magnetic core 40. In the preferred embodiment of the invention, the output or secondary transformer coil 55 has many turns, typically between 100 and 5000, such that a high current in the primary coil 45 induces a high voltage output in the secondary or output coil 55.

Figure 3:
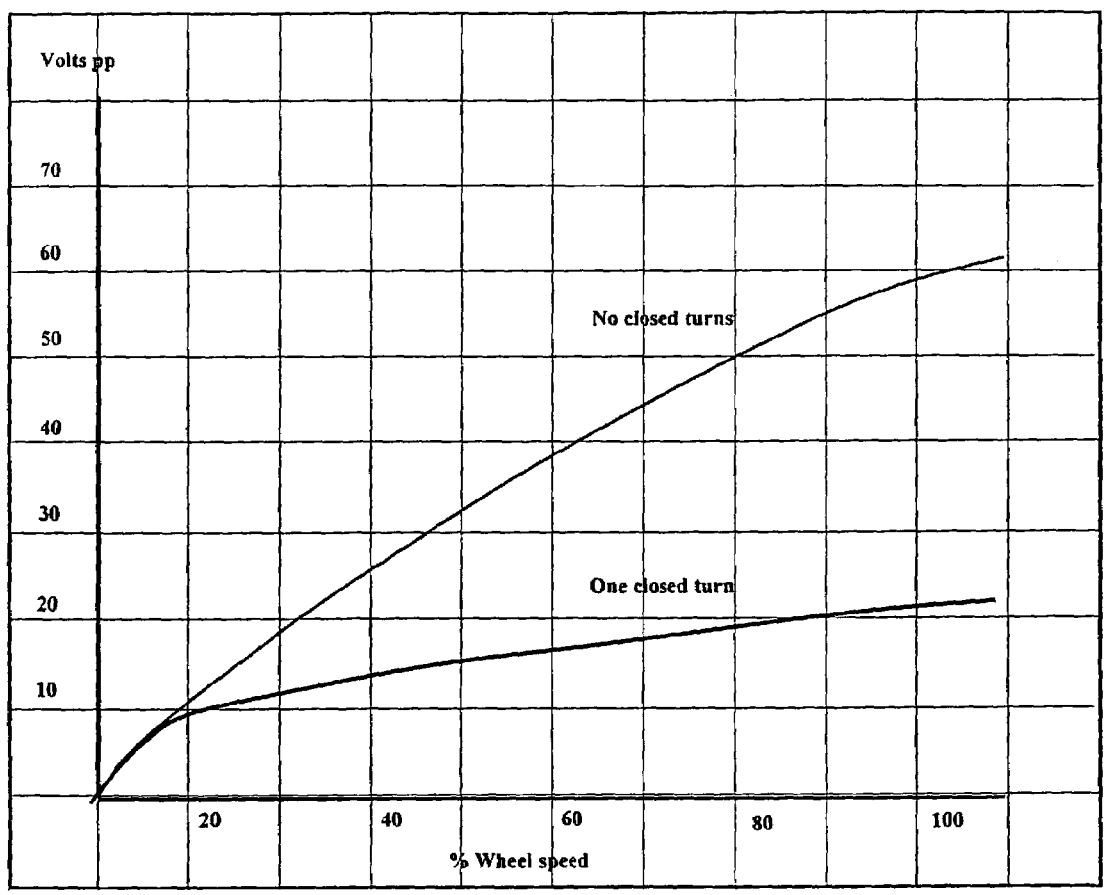
FIG. 3 shows a graph of output voltage against wheel speed, as a percentage of maximum wheel speed, for a transformer probe according to the preferred embodiment of the invention having a single closed turn and a transformer probe of the same construction having no shorting turns.

FIG. 3 shows a graph of output voltage against wheel speed as a percentage of maximum wheel speed for a transformer probe according to the preferred embodiment of the invention having a single shorting turn and a transformer probe of the same construction having no shorting turns. With no shorting turns, the amplitude of the output voltage signal of the output coil of the transformer probe increases at an approximately linear rate with increasing wheel speed. In contrast, the rate of increase of the amplitude of the output voltage signal of the transformer probe 50 according to the preferred embodiment of the invention, having a single shorting turn 60, decreases markedly as the wheel speed increases, such that the amplitude of the output voltage of the transformer probe at high wheel speeds is limited or increases slowly.

The operation of the closed turns 60 of the transformer probe 10 will now be described with reference to FIG. 4 which shows a circuit diagram of the transformer probe of FIGS. 1 and 2 where:

$V_1$ is the voltage generated in the pole piece coil 25 by the rotating wheel 70;
$V_2$ is the voltage across $L_2$;
$V_3$ is the output voltage of the transformer probe 10;
$R_1$ is the total DC resistance of the primary circuit 20;
$R_2$ is the transformed resistance;
$R_3$ is the load resistance;
$R_4$ is the resistance of the shorting turn or turns 60;
$L_1$ is the inductance of the pole piece coil 25 of the primary circuit 20;
$L_2$ is the inductance of the primary coil 45 of the transformer 50;
$L_3$ is the inductance of the output coil 55 of the transformer 50;
$C_1$ is the coil winding and load capacitance;
$N$ is the transformation ratio of the output coil 55;
$S$ is the transformation ratio of the shorting turn(s) 60; and
$\omega$ is $2\pi f$ where f is the frequency.

The output voltage $V_3$ from the transformer probe 10 is given by:

$$V_3 = V_2 \times N \qquad (1)$$

Figure 4:
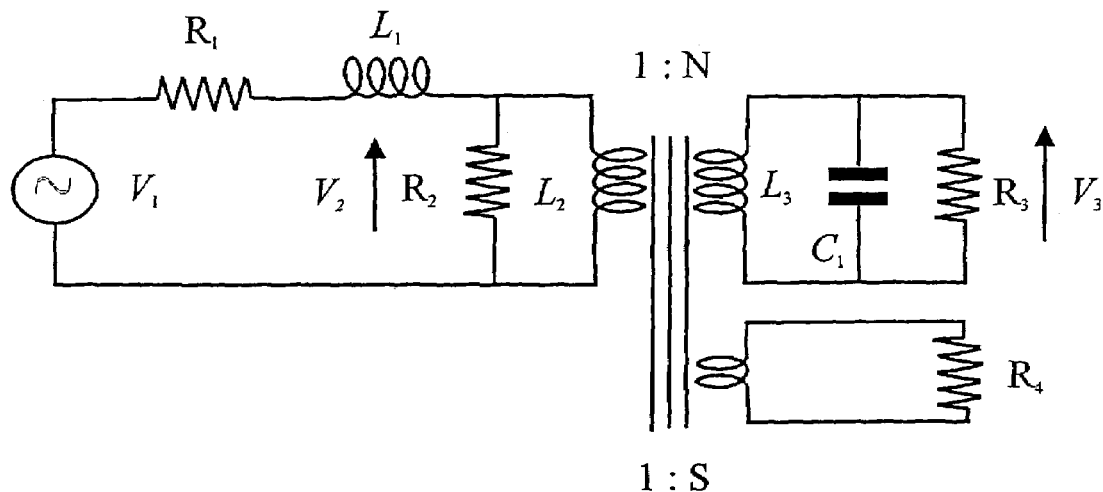
FIG. 4 shows an electrical circuit diagram for the transformer probe of FIGS. 1 and 2.

From FIG. 4:

$$V_2 = V_1 \frac{|Z|}{|Z + R_1 + j\omega L_1|} \qquad (2)$$

where:

$$Z = \frac{R_2 \times j\omega L_2}{R_2 + j\omega L_2} \qquad (3)$$

and:

$$R_2 = \frac{\frac{R_3}{N^2} \times \frac{R_4}{S^2}}{\frac{R_3}{N^2} + \frac{R_4}{S^2}} \qquad (4)$$

The output voltage $V_3$ of the transformer probe 10 is determined by the transformation ratio N of the transformer 50 and the voltage $V_2$ on the primary coil 45 of the transformer 50. The voltage $V_2$ on the primary coil 45 of the transformer depends upon the voltage divider consisting of the primary circuit resistance $R_1$, inductance $L_1$ and the impedance Z.

Figure 5:
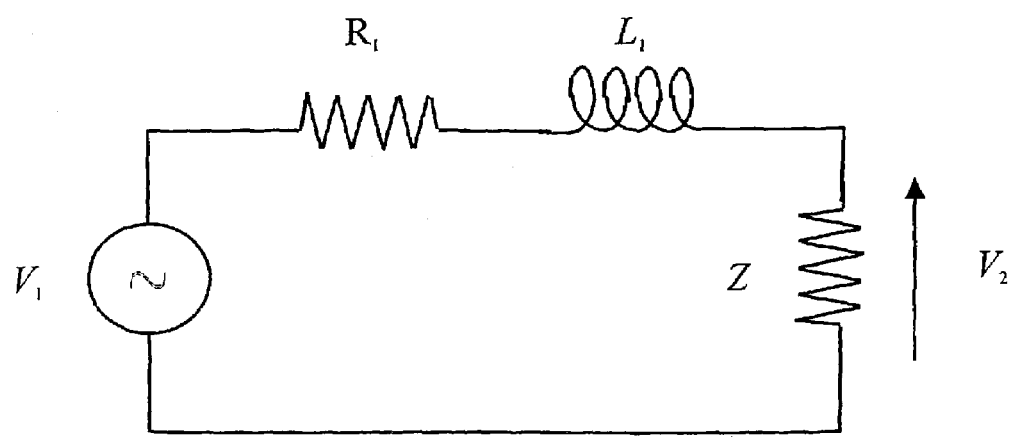
FIG. 5 shows a simplified version of the circuit diagram of FIG. 4.

As shown in FIG. 5, the impedance Z is the impedance of three components connected in parallel; the transformed load resistance $R_3$, the transformed closed turn resistance $R_4$ and the inductance of the primary coil $L_2$.

For a low frequency signal, the effect of the inductance $L_1$ of the pole piece coil 25 may be omitted, the impedance of the primary coil inductance $L_2$ will be very low and the effect of the transformed closed turn resistance is small. At low frequency:

$$V_2 = V_1 \frac{|j\omega L_2|}{|R_1 + j\omega L_2|} \quad (5)$$

and the voltage $V_2$ and, hence, the output voltage $V_3$ of the transformer probe 10 is effectively constant with frequency for constant $V_1$. In a real application where the shaft speed is increasing, both signal frequency and its amplitude $V_1$ will increase. This results, at low frequency, in an increase in voltage amplitude.

Figure 6:
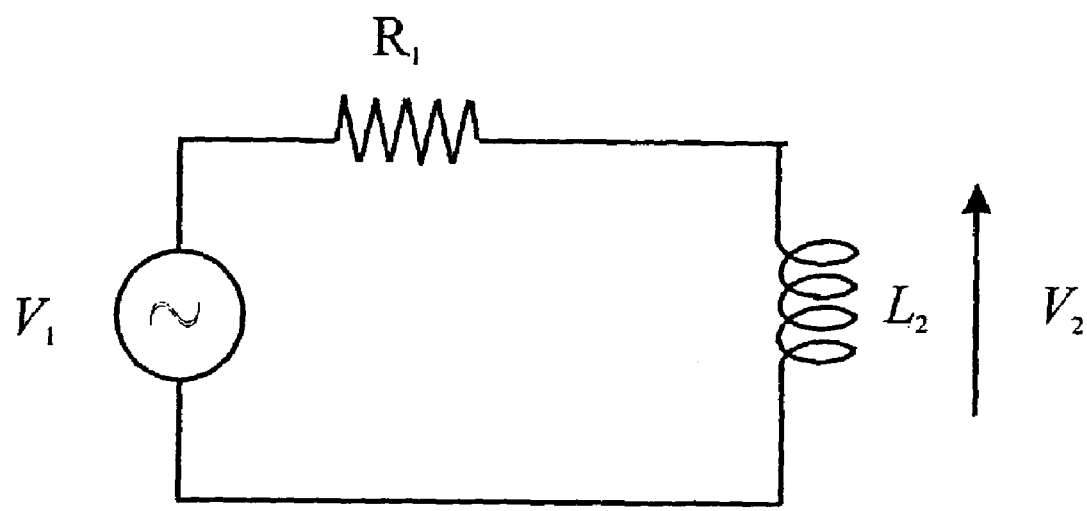
FIG. 6 shows the circuit diagram of FIG. 5 for low frequency operation.

A simplified circuit diagram for the transformer probe of FIGS. 1 and 2 for low frequency operation is shown in FIG. 6.

For a high frequency signal, the effect of the total DC resistance $R_1$ of the primary circuit 20 can be omitted, the impedance of the pole piece coil inductance $L_1$ will be high and the transformed closed turn resistance will be low and constant. At high frequency:

$$V_2 = V_1 \frac{|R_2|}{|R_2 + j\omega L_1|} = V_1 \frac{|R_4|}{|R_4 + j\omega L S^2|} \quad (6)$$

Where for large values of $R_3$, $R_2$ can be replaced by:

$$R_2 = \frac{R_4}{S^2} \quad (7)$$

and the voltage $V_2$ and, hence, the output voltage $V_3$ of the transformer probe 10 decreases with frequency for constant $V_1$.

Figure 7:
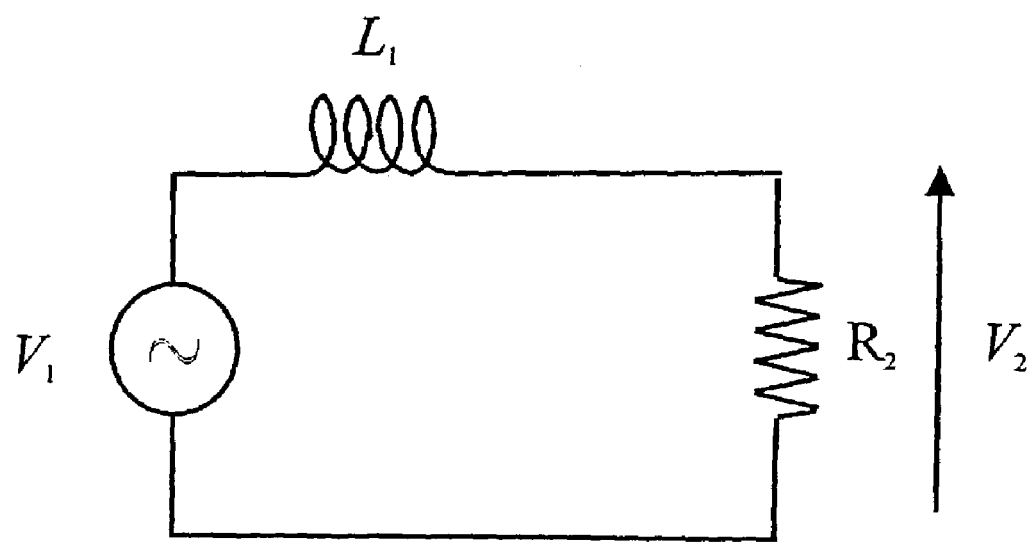
FIG. 7 shows the circuit diagram of FIG. 5 for high frequency operation.

A simplified circuit diagram for the transformer probe of FIGS. 1 and 2 for high frequency operation is shown in FIG. 7.

Thus, the voltage $V_2$ and, therefore, the output voltage $V_3$ of the transformer probe according to the invention is dependent on the shorting turn resistance $R_4$. The design parameters of the shorting turns may be established by electrical modelling of the circuit of a particular transformer probe of the type described above and through tests performed after the low speed operational characteristic of the particular transformer probe is found to be acceptable. The transformer probe is designed to operate satisfactorily at low speeds and then the shorting turns are designed so that their effect on the high speed operation ensures an acceptable high speed operation of the sensor initially designed with the low speed desiderate in mind. In essence, the shorting turns are used to fine tune the high speed operation of a probe know to be acceptable at low speeds.

In the preferred embodiment of the invention the transformer comprises typically between one and five shorting turns, which can be easily applied after the transformer has been built. The present invention, thereby, allows the transformer probe output curve to be relatively easily tuned by selection of the number of shorting turns and their resistance.

FIGS. 8 and 9 and the associated circuit diagrams of FIGS. 8a and 9a illustrate two further alternative embodiments of the subject invention.

FIG. 8 illustrates a transformer probe having two secondary or output coils 55a, 55b inductively coupled to the primary coil 50. The primary circuit 20 passes through two separate magnetic cores 40a, 40b each of which has a secondary coil 55 wound round it. One of the secondary coils 55a is also inductively coupled to a shorting turn or turns 60 (also wound round the respective magnetic core 40a).

The arrangement of FIG. 8 results in two different output coils 55 and hence in two output voltages. One of the output voltages will be limited because of the shorting turn or turns associated with the respective coil 55a whereas the other output voltage will not be so limited. As discussed below, the effect of limiting the voltage output from one of the output coils will be to increase the output from the other output coil.

The arrangement of FIG. 8 allows one to use a single probe to generate different output voltages meeting possibly different or conflicting requirements.

FIG. 8a shows an electrical circuit diagram representation of the probe of FIG. 8. The primary circuit 20 can be represented by a circuit having resistances $R_1$, $R_5$ and $R_6$ and an inductance $L_1$. The transform resistances $R_5$ and $R_6$ of the transformers 70a and 70b respectively. $R_5$ is the transformed of $R_3$ and $R_6$ is the transformed of $R_4$. The effect of the toothed wheel 70 passing the pole piece 30 can be represented as a voltage source $V_1$. The magnetic cores 40a and 40b each define separate transformers.

A first transformer 70a has an output coil 55a with an associated resistance $R_3$ and a shorted turn 60. A primary coil resistance $R_5$ is associated with the transformer 70a whose secondary coils are formed by the shorted turn (or turns) and the output coil 55a.

A second transformer 70b has an output coil 55b but no associated shorted turn. The primary coil resistance of the second transformer 70b is $R_6$.

FIG. 8a shows that the shorted turn is transformed into the primary circuit as resistance $R_5$. This resistance is smaller than the resistance $R_6$ so the same current in the primary circuit will result in a higher voltage across $R_6$ than across $R_5$ and hence result in a higher voltage across $R_4$.

FIG. 9 illustrates a transformer probe also having two secondary or output coils 55a, 55b. In addition, the probe has two different primary circuits 20a, 20b each having a separate pole piece coil 25a, 25b. The primary coil 50a, 50b of each primary circuit 20a, 20b is inductively coupled with a respective secondary coil 55a, 55b. the provision of two different primary circuits 20a, 20b reduces the coupling between the outputs from the respective output coil 55a, 55b and provides increased reliability due to the presence of 2 sensing circuits. The embodiment shown in FIG. 9 has a shorting turn 60 inductively coupled with only one of the secondary or output coils 55a so that only the voltage from one of the output coils is limited as described above in the embodiment of FIG. 8. It is also possible to provide a shorting turn or turns on the second output coil 55b.

FIG. 9a shows an electrical circuit diagram representation of the probe of FIG. 9.

The first primary circuit 20a can be represented as having resistances $R_1$ and $R_5$ where $R_5$ is the transformed resistance of the first transformer 70a. $R_5$ is the transform of $R_3$. The first transformer 70a has a magnetic core 40a to which are also inductively coupled a shorted turn (or turns) 60 and an output coil 55a having a resistance $R_3$.

The secondary primary circuit 20b is like the first except that it includes no shorted turn.

The only coupling between the two circuits 20a, 20b is through the pole piece 35. This is a loose or weak coupling and therefore the two circuits will not dramatically or significantly affect each other. The shorted turn of the first circuit 20a will not substantially affect the output voltage of the transformer 70b of the second circuit nor would a signal injected in one transformer (caused by, say, a fault or a warning circuit) affect the other transformer.

It will also be appreciated that whilst FIGS. 8 and 9 illustrate embodiments with only two primary circuits and/or output coils it is possible and contemplated to have greater numbers. If, say, four outputs are required it may be appropriate to have four output coils all connected in series in the manner shown in either of FIGS. 8 and/or 9

The invention claimed is:

1. A transformer probe for sensing movement of a body of magnetic material comprising:
   a magnetically energisable pole piece;
   a sensing circuit comprising an electrical circuit having a first portion which is inductively coupled to the pole piece, the arrangement being such that movement of a body of magnetic material relative to the pole piece induces a current in the sensing circuit, and a second portion, remote from the pole piece, which forms a transformer primary coil;
   a transformer secondary coil, inductively coupled to the primary coil formed by the second portion of the sensing circuit, and terminated by a load resistance and means for measuring an output signal from the secondary coil,
   wherein the primary and secondary coils form a transformer such that a current in the sensing circuit induces a voltage across the secondary coil; and
   at least one shorting turn of a conductor is inductively coupled to the primary and secondary coils.

2. A transformer probe according to claim 1 wherein the pole piece is magnetically energised by a permanent magnet.

3. A transformer probe according to claim 1 or 2 wherein the first portion of the sensing circuit is wound around the pole piece and forms a pole piece coil.

4. A transformer probe according to claim 1, wherein the primary and secondary coils of the transformer and the shorting turn or turns are wound around a common magnetic core.

5. A transformer probe according to claim 1, comprising two or more transformer secondary coils, each inductively coupled to a primary coil.

6. A transformer probe according to claim 5 comprising two or more transformer secondary coils each inductively coupled to the same transformer primary coil.

7. A transformer probe according to claim 6 wherein one of said secondary coils is inductively coupled to one or more shorting turns of a conductor, and one of said secondary coils is not inductively coupled to one or more shorting turns of a conductor.

8. A transformer probe according to claim 7 comprising two or more magnetic cores around which the transformer primary coil is wound and wherein two or more of the transformer secondary coils are each wound around a separate one of said magnetic cores and said shorting turn or turns is or are wound around the magnetic core around which the secondary coil with which they are coupled is wound.

9. A transformer probe according to any one of claims 5 to 8 wherein the probe comprises two or more sensing circuits each having a first portion inductively coupled to the pole piece and a second portion, remote from the pole piece, the second portions each forming a primary transformer coil, such that the probe comprises two or more transformer primary coils.

10. A transformer probe according to claim 9, comprising two or more transformer secondary coils each inductively coupled to a separate transformer primary coil.

11. A transformer probe according to claim 10 wherein one of said secondary coils is inductively coupled to one or more shorting turns of a conductor, and one of said secondary coils is not inductively coupled to one or more shorting turns of a conductor.

12. A transformer probe according to claim 10, wherein at least one transformer secondary coil and its associated transformer primary coil are inductively coupled to one or more shorting turns of a conductor.

13. A transformer probe according to claim 5, wherein at least one transformer secondary coil and its associated transformer primary coil are inductively coupled to one or more shorting turns of a conductor.

14. A transformer probe according to claim 13 comprising two or more magnetic cores around each of which a transformer primary coil, and the secondary coil and any shorting turns with which said primary coil is coupled are wound.

15. A transformer probe according to claim 13, wherein at least one transformer secondary coil is not inductively coupled to one or more shorting turns of a conductor.

16. A transformer probe according to claim 5, wherein at least one transformer secondary coil is not inductively coupled to one or more shorting turns of a conductor.

17. A speed sensor including the transformer probe of claim 1.

18. A torque sensor including the transformer probe of claim 1.

19. A transformer probe for sensing movement of a body of magnetic material comprising:
   a magnetically energisable pole piece;
   a sensing circuit comprising an electrical circuit having a first portion which is inductively coupled to the pole piece, the arrangement being such that movement of a body of magnetic material relative to the pole piece induces a current in the sensing circuit, and a second portion, remote from the pole piece, which is wound around two magnetic cores to form a two transformer primary coils;
   two transformer secondary coils, each being wound around one of said magnetic cores so as to be inductively coupled to the respective primary coil formed by the second portion of the sensing circuit, and terminated by a load resistance and means for measuring an output signal from the respective secondary coil,
   wherein each coupled primary coil, secondary coil and transformer core form a transformer such that a current in the sensing circuit induces a voltage across the respective secondary coil; and one or more shorting turns of a conductor are wound around one of said magnetic cores so as to be inductively coupled to one of the primary and one of the secondary coils; and no shorting turns are wound around the second magnetic core.

20. A transformer probe according to claim 19 comprising least two of said secondary coils.

21. A transformer probe for sensing movement of a body of magnetic material comprising:

a magnetically energisable pole piece;

two sensing circuits, each sensing circuit comprising an electrical circuit having a first portion which is inductively coupled to the pole piece, the arrangement being such that movement of a body of magnetic material relative to the pole piece induces a current in the said sensing circuits, and a second portion, remote from the pole piece, which is wound around a magnetic core to form a transformer primary coil;

two transformer secondary coils, each being wound around one of said magnetic cores so as to each be inductively coupled to one of the said primary coils formed by the second portions of the sensing circuits, and terminated by a load resistance and means for measuring an output signal from the secondary coil, wherein the inductively coupled pairs of primary and secondary coils and the magnetic cores around which they are wound each form a transformer such that a current in the respective sensing circuit induces a voltage across the respective secondary coil, one or more shorting turns of a conductor are wound around one of said magnetic cores so as to be inductively coupled to one of the pairs of the primary and secondary coils, and no shorting turns are wound around the other magnetic core so than the other of said pairs of primary and secondary coils is not inductively coupled to shorting turns of a conductor.

22. A transformer probe according to claim 21 comprising at least two of the said sensing circuits and a corresponding number of the said secondary coils.

* * * * *